(12) United States Patent
Kordosh

(10) Patent No.: US 6,358,564 B1
(45) Date of Patent: Mar. 19, 2002

(54) PROCESS FOR REFINISH COATING OF PORCELAIN AND CERAMIC SUBSTRATES

(75) Inventor: John R. Kordosh, Simi Valley, CA (US)

(73) Assignee: The Glidden Company, Cleveland, OH (US)

(*) Notice: Subject to any disclaimer, the term of this patent is extended or adjusted under 35 U.S.C. 154(b) by 0 days.

(21) Appl. No.: 09/649,751

(22) Filed: Aug. 28, 2000

(51) Int. Cl.⁷ .................................................. B05D 3/10
(52) U.S. Cl. .................... 427/309; 427/140; 427/290; 427/292; 427/307; 216/96; 216/108
(58) Field of Search .................... 216/96, 108; 427/140, 427/142, 290, 292, 307, 309, 444

(56) References Cited

U.S. PATENT DOCUMENTS 4,292,236 A * 9/1981 Ibsen et al. ............... 260/42.52
4,294,349 A * 10/1981 Ibsen et al. ................. 206/63.5
6,020,028 A * 2/2000 Kinneberg ................... 427/316

OTHER PUBLICATIONS

Lewis, Richard J., Hawley's Condensed Chemical Dictionary, 1993 (no month), Van Nostrand Reinhold, 12th Edition, p. 1224.*

* cited by examiner

Primary Examiner—Shrive P. Beck
Assistant Examiner—Jennifer Calcagni
(74) Attorney, Agent, or Firm—Thomas M. Schmitz

(57) ABSTRACT

A process for preparing an old porcelain or ceramic substrate and refinishing with an epoxy coating top coat, where the old substrate is treated with an aqueous solution of citric acid prior to the step of coating with epoxy. In preferred aspects, the old substrate is treated with aqueous calcium carbonate solution prior to treating with the citric acid solution.

3 Claims, No Drawings

PROCESS FOR REFINISH COATING OF PORCELAIN AND CERAMIC SUBSTRATES

This invention pertains to a process for refinish coating of porcelain and ceramic surfaces, and more particularly to process steps for preparing old porcelain and ceramic substrates and refinish coating the substrate with epoxy enamel protective coatings.

BACKGROUND OF THE INVENTION

Repainting projects ordinarily require good preparation of the old substrate prior to applying a new paint coating. Substrate preparation is particularly important prior to refinish coating an existing porcelain or ceramic surfaces such as bathroom tubs. The refinish process ordinarily requires a tedious series of steps including cleaning, etching, sanding, washing, drying and otherwise preparing the old surfaces prior to refinish coating being applied. In the past, potentially harmful and dangerous chemicals were used to prepare the surfaces for refinish coating, such as muriatic acid or hydrochloric acid, which were used to etch the surfaces prior to refinish coating. These chemicals however are known to be difficult to use, especially for a non-professional, and frequently expel noxious odors and fumes which can be poisonous and perhaps even fatal in some instances in a non-ventilated area. The acids are corrosive and require protective clothing when using to avoid contact with skin and to keep the vapors from causing a burning sensation of the eyes.

It now has been found that a new simplified and much safer method of refinish coating old porcelain and ceramic substrates can be achieved by using citric acid to etch the substrate surfaces in the surface preparation process. Citric acid is a naturally occurring organic acid found in citrus fruits and commonly is used in foods and pharmaceuticals. Citric acid for instance is often used as an additive in fruit flavored beverages. A major advantage of this process is that citric acid is a rather strong organic acid but not corrosive as muriatic or hydrochloric acids and can be easily handled without health or environmental concerns and without special handling precautions. Since citric acid is widely used in foods, and the toxicity in use is negligible, while the process of preparing the substrate including etching the substrate surface can be done by an ordinary craftsman without elaborate protective precautions. Disposal of citric acid does not create a hazardous chemical disposal problem. Citric acid is a dry solid and can be easily mixed with water to form an aqueous solution for use. In preferred aspects of this invention, aqueous sodium carbonate solution is used to clean the substrate prior to the step of etching with citric acid solution. After the porcelain or ceramic substrate has been properly prepared in accordance with this invention, an epoxy enamel can be applied and cured to form a hard painted surfaces comparable to original substrate surface with excellent adhesion to the former porcelain or ceramic substrate. With old porcelain sink and tubs, particularly those produced before 1980, the citric acid treatment resulted in equal or better adhesion of the epoxy finish coat when compared to hydrochloric acid treatment. These and other advantages of this invention will become more apparent by referring to the detailed description of the invention and illustrative examples.

SUMMARY OF THE INVENTION

Briefly, the invention pertains to a process of preparing and coating existing porcelain and ceramic substrates with a refinish coating, the process steps including cleaning, etching, sanding, and washing, where the improvement comprises etching the substrate with aqueous citric acid prior to the step of refinish coating the substrate with epoxy coating. The preferred process includes the step of cleaning old ceramic or porcelain substrate with an aqueous cleaning solution of sodium carbonate prior to the step of etching with citric acid.

DETAILED DESCRIPTION OF THIS INVENTION

The invention pertains to using citric acid to etch porcelain or ceramic substrates with citric acid prior to the step of refinish coating the substrate with epoxy coating. Citric acid is a naturally occurring organic tricarboxylic acid compound commonly found in most fruit and some plants. In dry form, citric acid can by anhydrous or monohydrate crystalline solid ordinarily translucent and colorless in form. Citric acid and the anhydrous or salt forms of citric acid are ordinarily solvated in water to typically form a 50% by weight aqueous solution of citric acid. The water content of the aqueous solution is not critical but preferably is between about 30% and 70% by weight water, with the remainder being citric acid.

In accordance with the process of this invention, an existing porcelain or ceramic surface substrate can be refinish coated by first etching the substrate surface with an aqueous mixture of citric acid and then coating the prepared and etched surface with epoxy coating. Ordinarily the old substrate surface is cleaned, etched, sanded, rinsed and dried prior to applying refinish epoxy coating to the substrate, although the order of steps is not critical. The etching treatment of the substrate surface with citric acid is washed off and the surface preferably is dried prior to coating the substrate surface with epoxy. The citric acid solution is preferably applied to the substrate at ambient temperature and conveniently between about 40 and 95° F. The citric acid solution need not be warmed although solution temperatures between about 60° F. and 85° F. have been found to be particularly helpful.

In preferred aspects of this invention, the old ceramic or porcelain substrate is first cleaned with an aqueous solution of sodium carbonate prior to the step of etching with citric acid. An aqueous sodium carbonate solution is strongly alkaline or ordinarily can contain about 10% to 30% by weight sodium carbonate in water. Sodium carbonate is a white crystalline solid known in the trade as ash, soda ash, soda, and calcined soda.

Prior to the discovery of the use of sodium carbonate cleaning solution in accordance with the invention, substrate cleaning solutions were based on trisodium phosphate solutions. However, trisodium phosphate solution, a common cleaning solution for many purposes, is a hazardous chemical and, in fact, has been banned in several states in the United States because of the phosphate content. The phosphate causes serious environmental hazard associated with phosphates in the water supply. In contrast, sodium carbonate solutions useful in accordance with this invention are not an environmental nor a health hazard and, hence, can be safely used without extraordinary safety precautions.

After the old substrate surface has been properly prepared in accordance with this invention, the prepared and etched substrate can then be coated with epoxy coating. Preferred epoxy coatings are two component coreactive epoxy coatings based on epoxy binder comprising a reactive epoxy terminated component and a coreactive crosslinking component. Epoxy coatings ordinarily comprise resin binder, water or organic solvent, curing agents, and pigments.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'dihydroxy bisphenol, with the most preferred being bisphenol-A. Halohydrins include epichlorohydrin, dichlorohydrin, and 1,2-dicloro 3-hydroxypropane with the most preferred being epichlorohydrin. Preferred epoxy resins comprise the coreaction product of excess molar equivalents of epichlorohydrin and bisphenol-A to produce predominately an epoxy group terminated linear molecular chain of repeating units of diglycidyl ether of bisphenol-A containing repeating copolymerized units of diglycidyl ether of bisphenol-A. In practice, excess molar equivalents of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are poly-glycidyl ethers of bisphenol-A having terminating 1,2-epoxide groups. Lower molecular weight epoxy resins are preferred for two component ambient cure systems, where expoxy resin is coreacted and crosslinked with a coreactive curing agent. Higher molecular weight epoxy resins can be used in solvent systems.

Epoxy resins react readily with primary and secondary amines at room temperature where the amines provide the crosslinking agents in a two component system. Polyamides, polyamines, and similar diamine adducts, as well as polysulfides are typical crosslinking agents useful for ambient cure epoxy systems. Primary aliphatic amines are particularly useful for producing ambient cures for high quality epoxy finishes. Organic solution higher molecular weight epoxy coatings typically utilize simple amines such as diethylene diamine, diethylene triamine, and diethylamino propylamine as ambient curing agents.

Most conventional paint pigments can be used with epoxy coatings, such as for instance, cadmium sulfide, titanium dioxide, chromic acid, and calcium carbonate.

The merits of this invention are further illustrated by the following illustrative examples.

EXAMPLE 1

An old porcelain surface tub was prepared for refinish coating with an epoxy topcoat in accordance with this invention as follows.

1. The old tub was cleaned, then spot sanded to smooth over rust spots if necessary. Cracks and pits were filled with a filler putty compound.
2. Surface cleaner consisting of a dilute warm aqueous solution of calcium carbonate was then applied to the tub surface using a sponge. The tub surface was then rinsed clean with water.
3. The cleaned surface was then treated with a dilute warm aqueous solution of citric acid. The citric acid solution was prepared by completely dissolving of citric acid crystals in one-half gallon of warm water. The solution was stirred if necessary to assure complete dissolution of crystals into water. The tub was scrubbed with a sponge saturated with the warm citric acid solution for about 30 minutes while keeping the tub surface continually and constantly wet. The citric acid treated tub surface was then rinsed twice with clear water.
4. The treated tub surface was then lightly sanded with #220 grit wet/dry sandpaper. The sandpaper was dipped into water at regular intervals to facilitate the sanding process.
5. The wet-sanded tub surface was again thoroughly washed with clear water to ensure complete removal of sanding grit. The rinsed tub surface was allowed to air dry for over 12 hours (overnight).
6. A two part epoxy compound consisting of an epoxy resin pigmented white part A and a coreactive catalyst part B. Components A and B were mixed thoroughly and then left to age 45–60 minutes before using. A thin first coat of catalyzed epoxy mixture was then brushed onto the tub surface. A thin coat was applied to avoid sagging and runs. The brushed coat was then smoothed over with a roller. Alternatively, the coating can be spray applied by thinning with about 15% lacquer thinner. The first applied coating was allowed to dry for two hours. A second coat was applied by mixing together a second set of components A and B to provide a second catalyzed white epoxy paint for application to the tub surface. The second applied catalyzed coating was left to air dry for two hours. A third catalyzed epoxy coating can be applied, if desired, but is not normally necessary.
7. The white epoxy coated bath tub was left to air dry without using for 5 days. Drain and tub fixtures were replaced and the refinished tub was ready for use again. The applied refinish epoxy coating provided a white surface topcoat comparable to the original porcelain finish.

EXAMPLE 2

A. A porcelain sink was refinished with an epoxy coating similar to the procedure of Example 1 and the refinished sink was comparable in appearance to the original porcelain finish.
B. Ceramic tile walls surrounding a tub were refinished with epoxy refinish coating in a manner similar to Example 1. The refinished tile walls had a finish coating comparable in appearance to the original ceramic tile surface.

EXAMPLE 3

In accordance with this invention and in a manner similar to Example 1, citric acid treatment of old porcelain substrate sinks was compared to muriatic acid treatment. Although citric acid seemed to etch the old surfaces slightly slower than muriatic acid, the citric acid treatment provided better etching characteristic and resulted in equal or improved adhesion of the two part epoxy coating to the old substrate. The substrates were treated with citric acid or muriatic acid aqueous solutions for about 15 to 20 minutes. The treated substrates were then cleaned with water, wet sanded, rinsed, and dried overnight, as previously indicated. The treated substrate was then repainted with a two part refinish epoxy white paint. The cured epoxy surfaces were tested for adhesion three days later and again at six days. The "Control" was a strip on each substrate not treated with either citric acid or muriatic acid. Porcelain substrates tested were as follows and the test results are reported below in Table 1. The adhesion test rated adhesion on a scale of 1 to 10 with a rating of 10 being excellent.

| Substrate | Description |
| --- | --- |
| No. 1 | Cast iron sink dated 1948. |
| No. 2 | Cast iron sink dated 1952. |
| No. 3 | Cast iron sink dated 1930's. |
| No. 4 | Metal sink dated 1981. |

TABLE 1

| Substrate | No. | Citric Acid | Muriatic Acid | Control |
| --- | --- | --- | --- | --- |
| No. 1 | (3 days) | 10 | 9 | 0 |
|  | (6 days) | 10 | 10 | 0 |
| No. 2 | (3 days) | 8 | 6 | 5 |
|  | (6 days) | 10 | 9 | 7 |
| No. 3 | (3 days) | 10 | 7 | 0 |
|  | (6 days) | 7 | 4 | 0 |
| No. 4 | (3 days) | 7 | 4 | 0 |
|  | (6 days) | 10 | 7 | 8 |

EXAMPLE 4

It was found that newer metal or cast iron substrate sinks manufactured after about 1980 required about a 30 minute continuous citric acid treatment to obtain improved good adhesion results comparable to old substrates manufactured before about 1980.

What is claimed is:

1. In a process for refinish coating old porcelain or ceramic substrate surfaces, the process including the steps of cleaning, etching, sanding, washing and refinish coating the old substrate, the improvement comprising cleaning the old substrate with an alkaline aqueous solution of calcium carbonate containing by weight between about 10% to 30% by weight of calcium carbonate, and then etching the cleaned old substrate with an aqueous solution of citric acid prior to the step of refinish coating the old surface.

2. In the process of claim 1, refinish coating the old substrate surface with an epoxy coating after the step of etching with an aqueous solution of citric acid.

3. A process for refinish coating an old porcelain or ceramic surface substrate, the process including the steps of:

cleaning the old substrate surface with an aqueous solution of calcium carbonate containing at least 10% by weight of calcium carbonate;

etching the old substrate surface with an aqueous solution of citric acid;

refinish coating the old substrate surface with epoxy coating.

* * * * *